Oct. 28, 1958  S. T. YANAGISAWA ET AL  2,858,233
METHOD OF FORMING A MULTI-COLOR SCREEN ON THE IMAGE PLATE
OF A COLOR TELEVISION TUBE AND PRODUCT
Filed Dec. 17, 1953
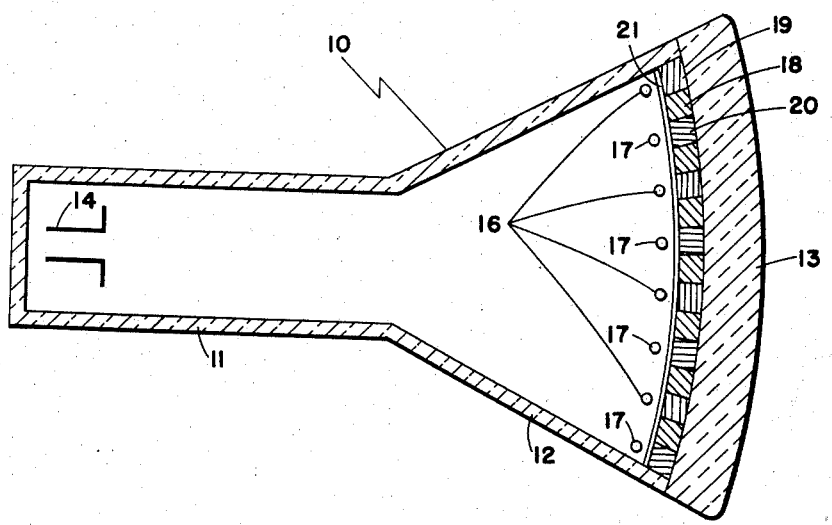
FIG. 1
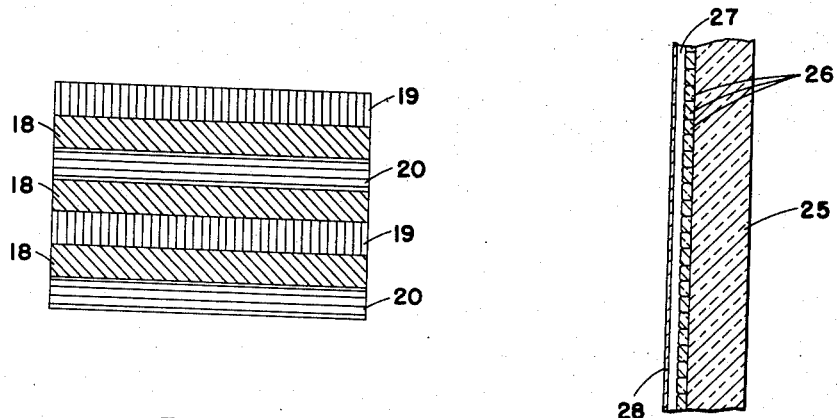
FIG. 2
FIG. 3
*INVENTORS*
HENRY F. MISERROCHI
SAMUEL T. YANAGISAWA
BY
*John C. Dorfman*
ATTORNEY

United States Patent Office 2,858,233
Patented Oct. 28, 1958

2,858,233

METHOD OF FORMING A MULTI-COLOR SCREEN ON THE IMAGE PLATE OF A COLOR TELEVISION TUBE AND PRODUCT

Samuel T. Yanagisawa, Stamford, and Henry F. Miserocchi, Old Greenwich, Conn., assignors to Machlett Laboratories, Incorporated, Springdale, Conn., a corporation of Connecticut Application December 17, 1953, Serial No. 398,742

8 Claims. (Cl. 117—33.5)

This invention concerns color television tubes wherein a plurality of colors must be applied to a single surface with great accuracy in the dimensions and location of each color area with respect to every other color area. More specifically, the present invention concerns the precision application of a plurality of colors to a single surface of a viewing plate in a color television tube.

A number of television systems have been developed wherein the screen or viewing plate produces more than one color. It has been common to obtain the various required colors by a careful and exacting application of a variety of colored phosphors to specific areas of the screen or plate. The manufacture of such a screen or image plate, because it is such a tedious and exacting process, is consequently quite expensive. By the use of the present invention, the same quality of screen may be achieved without repetition of the tedious exacting process heretofore required in the making of each color image plate.

The present invention consists of employing colored glass rather than phosphors in the area where a particular color is desired to be produced. These areas of colored glass may be fused directly to the image plate on one side thereof. Over the colored glass is then placed a uniform coating of a phosphor of one color, usually white. Thus, when the phosphor above an area of a certain color is impinged, the color of the glass below the phosphor will be seen by those viewing from the other side of the image plate. In some cases it is also desirable to place a coating of conductive material over the phosphor. Such a conductive coating may also be readily applied by techniques well known in the art.

The application of colored glass to the proper areas of the image plate may be rendered quite easy by the use of the present invention. According to a preferred method of the present invention, application of said glass involves the use of a decalcomania to which colored powdered glass has been applied in the pattern which is to appear on the image plate. Such a decalcomania may be formed using conventional simple decalcomania practices. Thereafter the decalcomania is applied to the surface of the image plate and allowed to dry thoroughly. Finally, the image plate is placed in an oven and baked at a temperature sufficiently high to fuse the colored glass to the plate. The phosphor is then applied over the fused glass areas after the image plate has had an opportunity to cool.

For a better understanding of the present invention reference is made to the following drawings:

Fig. 1 illustrates schematically an axial section a color television tube employing stripes of three colors on an image plate, which stripes have been greatly exaggerated in size relative to the tube size.

Fig. 2 is a plan view of a portion of an image plate from inside the tube structure illustrating how parallel stripes of color are employed on the image plate.

Fig. 3 is a sectional view of a portion of the image plate and its coatings in accordance with the present invention showing the various layers of material which may be applied to said image plate.

Referring to Fig. 1, there is represented schematically a color television tube structure. This tube is structurally quite similar to any television kinescope employed in black and white television applications. Its vacuum envelope, generally designated 10, comprises a small diameter neck portion 11 of generally cylindrical form, a conical section 12 and a slightly convex end wall 13. End wall 13 also is a viewing plate through whose transparent surface the image produced by the picture tube is seen. At the opposite end of the tube from image plate 13, in the neck portion 11, is mounted a cathode ray gun 14 of any conventional type. The present color television tube and the usual black and white television receiver tube, to this extent, are essentially the same.

Although it is possible to employ the present invention with various types of color television tubes, all of which have exacting requirements dimensionally, it is perhaps most convenient to discuss that type of television tube which employs so-called post deflection focusing means. One of the most widely useful post-deflection focusing systems employs a plurality of parallel conductors which are conveniently rod or wire-like in form. These wires or rods are close spaced to the screen on the inside surface of image plate 13. Alternate ones 16 of these conductors or connected together. Intermediate ones 17 of these conductors are also connected together but electrically insulated from conductors 16. These conductors 16 and 17 are arranged at intervals such that the cathode ray beam can freely pass between each adjacent pair of them.

In one form of the color television tube of the type being described, the colored areas referred to hereinbefore are depicted as parallel stripes of colored phosphor which are employed next to one another. Stripes 18 of the first color, which is commonly green, are applied between the conductors 16 and 17 in the region which would normally be impinged by a cathode ray passing between the conductors 16 and 17. Behind the conductors 16 are stripes 19 of the second color, for instance, red, and behind conductors 17 are stripes 20 of a third color, for instance, blue.

In this particular type of structure the scanning may either be accomplished by movement of the cathode ray across the conductors 16 and 17 on each sweep, or it may be accomplished by movement parallel to the conductors but between the conductors. In either event, placing of an equal charge on each of the conductors 16 and 17 or no charge on either conductor, will permit the cathode ray beam to pass directly between the conductors and impinge onto the green phosphor 18. When red is desired a positive charge is applied to the conductor 16 so that the beam will be deflected out of its normal path by the attractive forces of conductor 16 and into the red phosphor 19 behind the conductor 16. Where a blue color is desired, the conductor 17 is made more positive than the conductor 16 and the cathode ray beam is thus attracted by conductor 17 into the blue phosphor 20.

Referring again to Fig. 1 a modification of the conventional television tube structure is shown. In this structure, as in the prior art, luminescence is produced by impingement of electrons of the cathode beam upon phosphor. However, in this instance, it is a series of fused glass stripes which provide the appearance of color. A dot of light produced by the phosphor at a particular point appears to be a particular color as viewed from the other side of the image plate through glass of that color.

The stripes of colored glass illustrated in Fig. 1 have been substantially magnified in size. Actually these stripes are usually only a few thousandths of an inch in width in a full size tube. Due to the extremely small dimensions involved, a great degree of exactness is required in maintaining the correct size of the individual stripes and the relationship between the adjacent stripes. The same problem of dimensional accuracy is involved in those cases where other types of color television apparatus are employed wherein several colors must be applied to one viewing plate.

Fig. 2 illustrates a highly magnified area of parts of a few of the stripes applied to the image plate, showing merely the relationship of the colors to one another and the arrangements of the stripes.

Although many techniques have been evolved for the applicaton of phosphor to the glass surface, almost all techniques are time consuming and tedious. In the present invention, however, once a printing press has been set up to the required degree of accuracy, the problem no longer remains serious. Whereas it is possible to print the phosphors directly onto the image plate, and it is within the contemplation of this invention to do so, the difficulties in accomplishing this end are many. The preferred method of the present invention involves printing of the colored material onto a decalcomania for convenient quick application to the glass. It is not difficult to print a decalcomania using an ink composed of colored ground glass in either a water soluble or an oil soluble vehicle. In order to make the ink, colored glass is ground to a fine powder and mixed with a binder of water or oil base resin until the mixture is of the consistency of printers' ink. The various colors may be prepared at the same time, but will have to be printed separately or by using multiple color printing and overlay techniques. There are a number of techniques in the printing art for obtaining accurate multi-colored printing and any of these techniques may be applied in this instance. Such a decalcomania may in conventionl form, for example, comprise a layer of glass particles arranged in a desired pattern within a transparent water-resistant film or binder, the film being secured to a supporting paper backing by a layer of water soluble gelatin or the like. Once this decalcomania is made, it is a relatively simple matter to place the decalcomania on the glass. This is done, for example, by wetting the decalcomania to dissolve the gelatin whereupon the paper backing may be easily removed either before or after the surface of the decalcomania has been placed in desired position on the face plate. The water on the film will tend to hold the film, which contains the pattern of glass particles, in positional relation with the face plate. Once the decalcomania is on the face plate, and the paper backing removed, the plate or the whole tube may be placed in an oven and fired. Firing will cause the film or binder material to burn away and will fuse the glass particles to the face plate, thus forming a permanent finish which will not tend to chalk or flake away, as will phosphor.

The physical properties of the color producing materials are most important. For instance, the thickness of the colored glass is quite critical. It must be thick enough to produce proper color but not too thick lest it filter out too much light. The use of the decalcomania and known printing techniques makes it possible to control this thickness quite readily, whereas applying very narrow phosphor stripes directly to the glass is quite difficult to do and very difficult to control, particularly as to thickness. The fused glass should have a stable color, both against heat and electron bombardment.

Fig. 3 illustrates more accurately the relative sizes and thicknesses of the image plate, the color stripes and the phosphor coat of the present invention. The fused colored glass stripes are indicated by numbers 26. A uniform phosphor layer 27 is coated over these fused glass stripes. This phosphor, of course, may be readily applied using techniques already known in the art and used in the black and white television industry. This phosphor 27 is preferably white in color but conceivably might vary in color for different applications. For example, such a "white" phosphor may be that known as the P6 phosphor which has in actuality three definite peaks in its spectral transmission curve, the peaks occurring at about 6700, 5200 and 4300 Angstroms indicating luminescence of light which is composed of the three primary colors red, green and blue preferred for television screens. It is particularly pointed out, however, that the colors of the phosphor need not match identically with the colors of the glass areas fused to the face plate. It is also sometimes convenient and desirable to employ a thin film 28, both conductive and reflective, on top of the phosphor. This film is used for collecting and conducting away electrons which impinge the target and reducing secondary emission. It also serves to reflect light generated by the phosphor and thus effectively intensify or concentrate said light.

The structure described is of superior quality as far as durability and accuracy of size and location of the color areas are concerned. It will be obvious that this structure could be constructed by means other than the use of the decalcomanias, i. e., by printing directly upon the face plate. While such an expedient is not preferred, it is intended that all such variations be within the scope of the present invention. Likewise, in the methods described in the claims, variations which would be within good practice, normally or conventionally employed in the art, are intended to be within the scope and spirit of the present invention.

We claim:

1. The method of forming a multi-color screen on the image plate of a color television tube comprising applying to a surface of the image plate a decalcomania comprising a layer of glass particles of a plurality of colors arranged in a pattern, to reproduce color pictures fusing the layer of glass particles to the surface of the image plate, and subsequently applying over the layer of glass particles a layer of phosphor which upon electron bombardment will fluoresce and emit light visible through the layer of colored glass particles.

2. The method of forming a multi-color screen on the image plate of a color television tube comprising applying to a surface of the image plate a decalcomania comprising a layer of glass particles of a plurality of colors arranged in a pattern, to produce color pictures fusing the layer of glass particles to the surface of the image plate, subsequently applying over the layer of glass particles a layer of phosphor which upon electron bombardment will fluoresce and emit light visible through the layer of colored glass particles, and thereafter covering the layer of phosphor with a relatively thin metallic coating.

3. The method of forming a multi-colored screen on the image plate of a color television tube comprising applying to a surface of the image plate a decalcomania comprising a layer of glass particles of a plurality of colors arranged in parallel stripes of red, green and blue colors, fusing the layer of glass particles to the surface of the image plate, and subsequently applying over the layer of glass particles a layer of phosphor which upon electron bombardment will fluoresce and emit light visible through the layer of colored glass particles.

4. The method of forming a multi-colored screen on the image plate of a color television tube comprising applying to a surface of the image plate a decalcomania comprising a layer of glass particles of a plurality of colors arranged in parallel stripes of red, green and blue colors, fusing the layer of glass particles to the surface of the image plate, subsequently applying over the layer of glass particles a layer of phosphor which upon electron bombardment will fluoresce and emit light visible through the layer of colored glass particles, and thereafter covering the layer of phosphor with a relatively thin metallic coating.

5. An image plate for a color television tube comprising a translucent face plate, a layer of glass particles on a surface of the face plate, said layer containing particles of a plurality of colors arranged in a pattern to reproduce color pictures, and a layer of phosphor on the layer of colored glass particles and adapted to emit light when subjected to electron bombardment which is visible through the layer of colored glass particles and the face plate.

6. An image plate for a color television tube comprising a translucent face plate, a layer of glass particles on a surface of the face plate, said layer containing particles of a plurality of colors arranged in a pattern to reproduce color pictures, a layer of phosphor on the layer of colored glass particles and adapted to emit light when subjected to electron bombardment which is visible through the layer of colored glass particles and the face plate, and a layer of conductive material superimposed upon the layer of phosphor.

7. An image plate for a color television tube comprising a translucent face plate, a layer of colored glass particles on a surface of the face plate and arranged thereon in parallel stripes of red, green and blue colors, and a relatively uniform layer of phosphor on the layer of colored glass particles and adapted to emit light when subjected to electron bombardment which is visible through the layer of colored glass particles and the face plate.

8. An image plate for a color television tube comprising a translucent face plate, a layer of colored glass particles on a surface of the face plate and arranged thereon in parallel stripes of red, green and blue colors, a relatively uniform layer of phosphor on the layer of colored glass particles and adapted to emit light when subjected to electron bombardment which is visible through the layer of colored glass particles and the face plate, and a relatively thin layer of conductive material superimposed upon the layer of phosphor.

References Cited in the file of this patent

UNITED STATES PATENTS

| | | |
|---|---|---|
| 2,476,570 | Van Horn et al. | July 19, 1949 |
| 2,485,607 | Kasperowicz | Oct. 25, 1949 |
| 2,599,739 | Barnes | June 10, 1952 |
| 2,616,816 | De Gier et al. | Nov. 4, 1952 |
| 2,629,679 | Rathke | Feb. 24, 1953 |
| 2,644,770 | Sadowsky | July 7, 1953 |
| 2,706,262 | Barnes | Apr. 12, 1955 |